Sept. 26, 1933.   M. DWORK   1,928,171
JACKING ATTACHMENT
Filed May 11, 1933
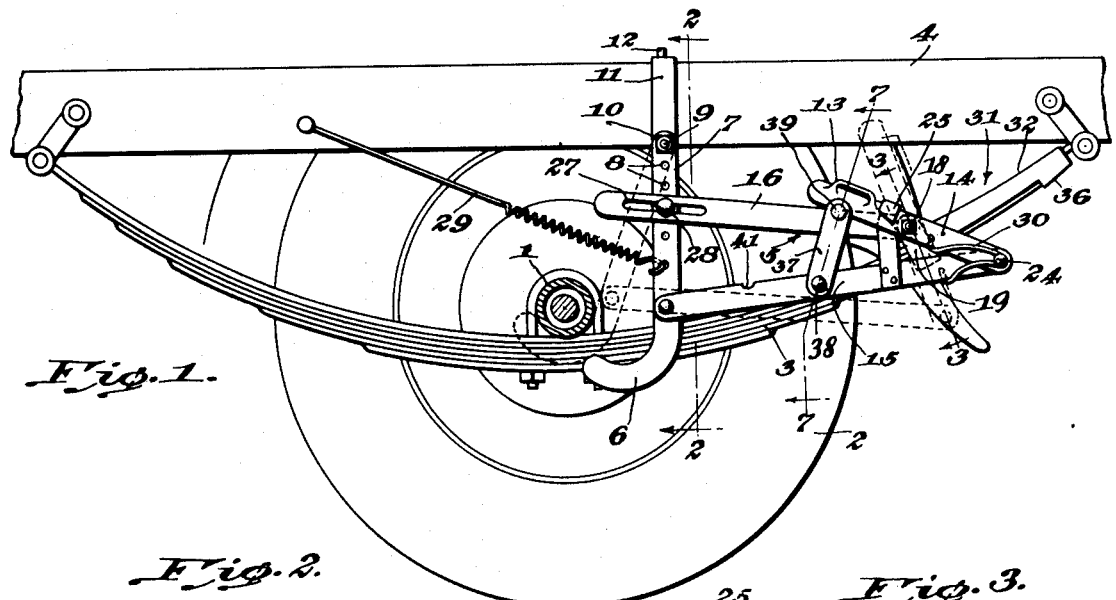
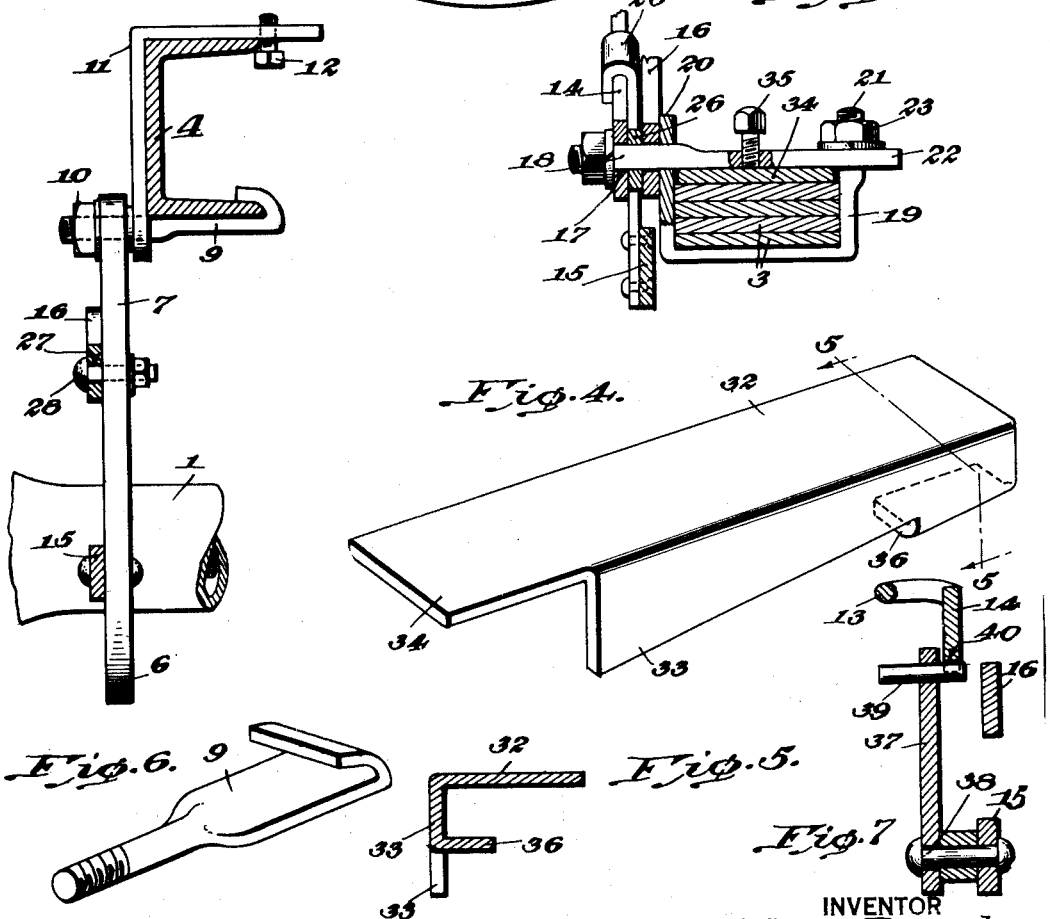
INVENTOR
Max Dwork,
BY
ATTORNEYS
WITNESSES

UNITED STATES PATENT OFFICE 1,928,171

JACKING ATTACHMENT

Max Dwork, Brooklyn, N. Y.

Application May 11, 1933. Serial No. 670,552

10 Claims. (Cl. 280—150)

This invention relates to improvements in jacking attachments in the class of pushing and pulling implements, and its objects are as follows:—

First, to provide sag limiting means for supporting the rear axle at a definite distance from the chassis when the automobile is jacked up by upward pressure on the chassis, so as to prevent the spring from sagging an undue amount and avoid the necessity of an injury to it.

Second, to provide a sag limiting means which is easily and conveniently reached from the side of the automobile at a point between the rear wheel and its fender, said means having a handle situated at said point to be grasped by the operator.

Third, to provide a supporting hook with a spring tending to draw it toward the axle and to include in the sag limiting means certain linkage with a lock for holding the hook in the retracted position against the tension of said spring.

Other objects and advantages will appear in the following specification, reference being had to the accompanying drawing in which, Figure 1 is a cross section of the rear axle of an automobile particularly showing the jacking attachment on the rear left side.

Figure 2 is a cross section taken on the line 2—2 of Figure 1.

Figure 3 is a cross section taken on the line 3—3 of Figure 1.

Figure 4 is a detail perspective view of a spring brace used in conjunction with the jacking attachment.

Figure 5 is a cross section taken on the line 5—5 of Figure 4.

Figure 6 is a detail perspective view of the hook bolt which both connects the axle hook and the chassis and provides a pivot for it.

Figure 7 is a detail section taken on the line 7—7 of Figure 1.

As briefly pointed out above, the invention is intended to limit the sag of the spring when the automobile is jacked up by applying pressure to the rear terminal of the chassis on either side. As far as this purpose is concerned the invention is an improvement on an application for Automobile jack, filed by Max Dwork, June 4, 1931, Serial No. 542,177 and a second application for patent for Jack, filed by Max Dwork, January 20, 1932, Serial No. 587,769. Each of these applications discloses a sag limiting means, and the present jacking attachment is a sag limiting means intended to improve upon those of the two applications mentioned.

Attention is directed to the drawing in which the rear axle is generally designated 1, the right rear wheel 2, the left rear spring 3 and a portion of the chassis 4. The jacking attachment is generally designated 5, and there is one of these on each side of the automobile at the rear. In order to illustrate one of the jacking attachments to the best advantage, the view (Fig. 1) is taken as though the left rear wheel were removed thereby to show the adjacent jacking attachment which is accessible and operable by reaching in between the wheel and the fender.

A hook 6 is so situated as to be swung beneath the axle 1 for supporting the axle and preventing sagging of the spring 3 when the chassis 4 is jacked up. The shank 7 of the hook has a series of holes 8, the uppermost one of which receives a bolt hook 9 (Figs. 2 and 6). This hook is attached to the chassis (Fig. 2) to which it is secured partly by the nut 10 and partly by a bracket 11 which extends up and over far enough to receive a screw stud 12. This stud is screwed into the extension of the bracket, and when it engages the chassis as shown (Fig. 2) serves to firmly hold the bracket without having to drill as much as a single hole into the chassis for the purpose.

The hook shank 7 is pivotally mounted on the bolt 9, and is swung between the full and dotted line positions (Fig. 1) by a handle 13 which is accessible in the space between the wheel and mud guard as already mentioned. This handle is part of a linkage comprising first, second and third bars 14, 15 and 16. The bar 14 carries the handle 13 and it is pivotally mounted at 17 on a pivot stud 18 which is affixed to the spring 3 by a clip 19 (Fig. 3). This clip is separate from and independent of the usual spring clips. One end of the special spring clip 19 is bent up at 20 and simply has a hole to let the stud 18 through. The other end of the clip is in the form of a threaded bolt 21 on which the flat plate part 22 of the stud 18 is fitted, said part having a hole to receive the bolt 21, whereupon a nut 23 is screwed down on the bolt 21.

A pivot 24 connects the bars 14 and 15, the latter having a lock 25 by which the bar 14 is retained when holding the hook 6 in the retracted full line position. The bar 14 is released from the lock by bearing down on the handle 13 and pulling slightly outward. The bar 14 can then be swung up to the dotted line position (Fig. 1) whereupon the linkage moves the hook 6 to the dotted line position in readiness to receive the axle 1 when the chassis is jacked up.

It is the function of the third bar 16 to stabilize the hook by preventing undue looseness. This bar is pivotally mounted on the stud 18 in common with the bar 14 (Fig. 3), the two being separated by a spacer 26. The opposite end of the bar 16 is slotted at 27 to receive a bolt 28 which secures it to the shank 7 in one of the holes 8 in a slidable manner.

A main spring 29, attached to the chassis and to the shank 7, tends to draw the hook 6 toward the axle 1. This tendency is prevented as long as the bar 14 is held beneath the lock 25. A single wire spring 30 is fitted between the bars 14 and 15 for the chief purpose of preventing loose play and rattling. This spring also helps to hold the bar 14 up in the lock 25.

For the purpose of avoiding injury to the spring 3 due to too much flexure at its outer and thinnest end substantially in the region 31, provision is made of a brace 32 (Figs. 1 and 4) which goes over and partly covers the thinnest part of the spring substantially as shown (Fig. 1). This brace comprises a side apron 33 and an extension 34. The extension goes under the plate 22 (Fig. 3), and the latter carries a lock screw 35 which is turned tightly against the extension 34 so as to hold the brace 32 in place. The brace includes a nethermost lip 36 (Fig. 4) which fits under the spring and assists in its support.

In order to prevent the possibility of the bar 14 jarring out from under the lock 25 in the ordinary use of the automobile a detent 37 is made to fit under the bar so as to hold it in the locked position. This detent is pivoted at 38 on the bar 15 and carries a pin 39 one end of which is adapted to fit in a notch 40 on the nether side of the bar 14, the outer end providing a fingerhold by which the detent is operated. When the detent is swung over into the non-locking position the inner end of the pin 29 enters a notch 41 in the upper side of the bar 15, thus limiting the swinging of the detent.

The operation is readily understood. Assume that the left side of the chassis is to be jacked up at the rear, this for the purpose of raising the left rear wheel (not shown) from the ground. The operator first reaches in between the wheel 2 and the mud guard on the left rear side, releases the detent 37, presses down a little on the handle 13 and then pulls outwardly to free the bar 14 from the lock 25. The spring 26 does the rest and inasmuch as it exerts a pull to the left, draws the hook 6 under the axle 1 in readiness to support the latter when the axle is jacked up.

After the vehicle is let down a reverse procedure is carried out. The operator reaches in and bears down on the handle 13, moving it from its dotted line position (Fig. 1) to a place low enough to bring the bar 14 beneath the lock 25. He then presses inwardly on the handle and so causes the bar to engage the lock. The detent 37 is then raised and the pin 39 forced into the notch 40 so as to secure the bar 14 in the locking position. The operation of swinging the handle causes the hook 6 to be swung to the full line position by means of the linkage.

It is anticipated that in moving up and down the spring 3 is subject to perhaps undue flexure especially at the outer or rear extremity. The brace 32 is intended to supplement the spring at this point and strengthen it so as to reduce the liability of its breakage. The plate 22 of the clip 19 (Fig. 3) is taken advantage of as the means for holding the brace in its working position, and the holding is accomplished by driving the lock screw 35 through against the tension 34 of the brace as shown.

I claim:—

1. A jacking attachment comprising a hook and means for pivotally mounting it on a chassis, linkage connected at one point with the hook for swinging the hook toward and from an axle into engaging and disengaging positions, and means for connecting the linkage at another point with a vehicle spring.

2. A jacking attachment comprising a hook and means for pivotally mounting it on a chassis, linkage connected at one point with the hook for swinging the hook toward and from an axle into engaging and disengaging positions, means for connecting the linkage at another point with a vehicle spring, and a lock incorporated in the linkage for locking the linkage and holding the hook in the disengaging position.

3. A jacking attachment comprising a hook and means for pivotally mounting it on a chassis, linkage connected at one point with the hook for swinging the hook toward and from an axle into engaging and disengaging positions, means for connecting the linkage at another point with a vehicle spring, a spring tending to move the hook into the engaging position and at the same time shifting the linkage to enable said engagement, and a lock incorporated in the linkage preventing said shifting of the linkage and movement of the hook.

4. A jacking attachment comprising a hook having a shank and means for pivotally mounting the shank on a vehicle chassis, a spring connected with the shank and with the chassis at a point forwardly of the vehicle axle, a pair of bars and means by which they are pivoted together, means for pivoting one of the bars on the vehicle spring, means for pivoting the second bar to the shank, and a lock carried by the second bar engaging the first bar.

5. A jacking attachment comprising a hook having a shank and means for pivotally mounting the shank on a vehicle chassis, a spring connected with the shank and with the chassis at a point forwardly of the vehicle axle, a pair of bars and means by which they are pivoted together, means for pivoting one of the bars on the vehicle spring, means for pivoting the second bar to the shank, a lock carried by the second bar engaging the first bar, and a handle on the second bar.

6. A jacking attachment comprising a hook having a shank and means for pivotally mounting the shank on a vehicle chassis, a spring connected with the shank and with the chassis at a point forwardly of the vehicle axle, a pair of bars and means by which they are pivoted together, means for pivoting one of the bars on the vehicle spring, means for pivoting the second bar to the shank, a lock carried by the second bar engaging the first bar, and a third bar pivoted on the vehicle spring in common with the first bar and having means for its slidable connection with the hook shank.

7. A jacking attachment comprising a hook having a shank and means for pivotally mounting the shank on a vehicle chassis, a spring connected with the shank and with the chassis at a point forwardly of the vehicle axle, a pair of bars and means by which they are pivoted together, means for pivoting one of the bars on the vehicle spring, means for pivoting the second bar to the shank, a lock carried by the second bar engaging the first bar, and a single wire spring tending to keep the first bar engaged with the lock, said spring having means for its attachment to the first and second bars.

8. A jacking attachment comprising a clip bent up at one end and having a threaded bolt at the other end, a plate fitted over the bolt and having a stud fitted through the bent up end, a nut screwed on the bolt to secure the clip to a vehicle spring, a pair of bars and means by which they are pivoted together at one end, one bar being pivotally mounted on the stud, a hook shank and means by which the second bar is pivotally connected with said hook shank, and means for pivotally supporting the hook shank on a vehicle chassis.

9. In combination with means for mounting a linkage on a vehicle spring, said means including a clip to go under the spring and a plate to go over the spring, a brace for a thin end of the spring comprising a nethermost lip to support the underpart of the spring and an extension to fit beneath the plate, and a lock screw carried by the plate to engage the extension.

10. A jacking attachment comprising a hook having a shank and means for pivotally mounting the shank on a vehicle chassis, a spring connected with the shank and with the chassis at a point forwardly of the vehicle axle, a pair of bars and means by which they are pivoted together, means for pivoting one of the bars on the vehicle spring, means for pivoting the second bar to the shank, a lock carried by the second bar engaging the first bar, and detent means carried by the second bar engageable with the first bar to secure the first bar in the locked position.

MAX DWORK.